Figure 1:
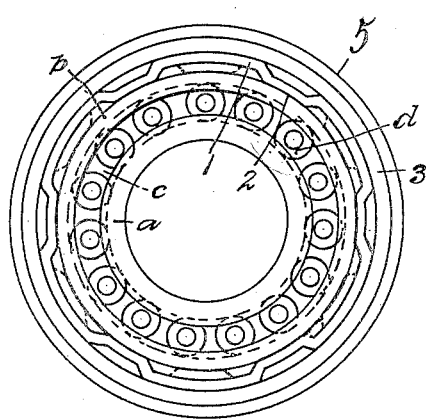

E. MEIER.
HOLDER FOR BALL AND ROLLER BEARINGS AND THE LIKE.
APPLICATION FILED MAY 21, 1918.

1,329,720.

Patented Feb. 3, 1920.

Inventor
Erling Meier,
By
Atty.

UNITED STATES PATENT OFFICE.

ERLING MEIER, OF CHRISTIANIA, NORWAY.

HOLDER FOR BALL AND ROLLER BEARINGS AND THE LIKE.

1,329,720.  Specification of Letters Patent.  Patented Feb. 3, 1920.

Application filed May 21, 1918. Serial No. 235,891.

*To all whom it may concern:*

Be it known that I, ERLING MEIER, a subject of the King of Norway, residing at Christiania, in the Kingdom of Norway, have invented certain new and useful Improvements in Holders for Ball and Roller Bearings and the like; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention has for its object to provide a holder for ball and roller bearings comprising an outer and an inner ring the adjacent surfaces of which are provided respectively with circumferential and axial grooves or depressions the latter beginning alternately at opposite sides of the ring surface and extending half-way across the ring surface.

Said circumferential grooved and axial depressions coöperate to facilitate the supply of oil to the adjacent surfaces of the rings of the holders, which are adapted to adjust themselves automatically relatively to each other in the usual manner.

The insides of the depressions in the inner ring are preferably located on a spherical surface—the outer surface of the outer bearing ring of the bearing box or cage being likewise spherical.

On the drawing:

Figure 1 is an end view and

Figure 2:
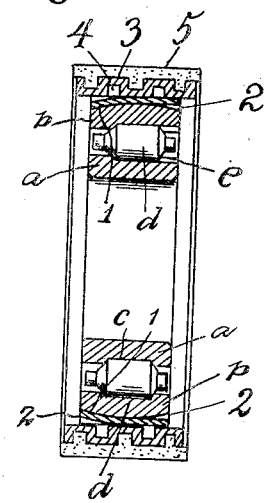

Fig. 2 an axial section through a roller bearing embodying the invention.

The inner holder-ring 1 is provided with depressions 2 extending alternately from the opposite edges of the ring and the inside of which are located on a spherical surface, inclosing the outside surface of the outer ring of the ball or roller bearing. The bearing here shown, comprises a roller box or cage consisting of an inner bearing ring $a$ and a concentric outer bearing ring $b$, the opposing faces of said bearing rings being grooved to form a channel $c$ for the anti-friction rollers $d$. A notch $e$ in one side of each bearing ring forms, when the notches are brought into register, an opening communicating with the channel $c$ large enough to permit the insertion of the rollers between the rings.

The holder ring 1 is slidably mounted inside the ring 3 which is provided with circumferential grooves 4. Said grooves are normally filled with oil and communicate with the oil chamber of the bearing box by means of the depressions 2 in the inner ring 1. At the same time the grooves act to increase the strength of the holder ring 2 so that the same may be manufactured of comparatively thin sheet metal or the like.

The holder illustrated on the drawing is particularly designed for electrical machinery and the grooved outer ring is therefore inclosed by a layer 5 of insulating material.

Claims:

1. A holder for ball bearings, roller-bearings and the like, comprising an outer annular bearing member, two concentric slidably mounted holding members inclosing the outer bearing ring, said holding members being provided on their adjacent surfaces respectively with circumferential and axial grooves or depressions which coöperate to supply oil to the sliding surfaces.

2. A holder for ball bearings, roller-bearings and the like, comprising an outer annular bearing member, two concentric slidably mounted holding members inclosing the bearing member, the inner holding member being provided with axial depressions extending alternately from opposite sides, and the outer holding member being provided with circumferential grooves supplied with lubricant by means of the depressions of the inner ring.

3. A holder for ball bearings, roller-bearings and the like, comprising an outer bearing ring, two pressed sheet metal holder rings slidably mounted one within the other, the inner ring being provided with axial depressions, the inside faces of which are located on a spherical surface and inclose the outer spherical surface of said bearing ring, the outer holder ring being provided with circumferential grooves supplied with lubricant by means of the depressions of the inner ring.

4. A holder for ball bearings, roller-bearings and the like, comprising an outer bearing ring. two annular members slidably mounted one within the other, the inner of which incloses said outer bearing ring, said two annular members being provided on their adjacent surfaces respectively with circumferential and axial grooves or depressions which coöperate to supply oil to the sliding surfaces, the outer holder-ring being inclosed in a layer of electrically insulating material cast into the circumferential grooves of the same.

In testimony that I claim the foregoing as my invention, I have signed my name in presence of two subscribing witnesses.

ERLING MEIER.

Witnesses:
  MOGENS BUGGE,
  MARTHA RISER.